US011991047B2

(12) United States Patent
Thompson et al.

(10) Patent No.: US 11,991,047 B2
(45) Date of Patent: *May 21, 2024

(54) DETECTING ACCESS POINTS LOCATED WITHIN PROXIMITY OF A COMPUTING DEVICE FOR TROUBLESHOOTING OF A NETWORK

(71) Applicant: Fortinet, Inc., Sunnyvale, CA (US)

(72) Inventors: Jordan E. Thompson, Vancouver (CA); Andrea Gottardo, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,153

(22) Filed: Jan. 17, 2023

(65) Prior Publication Data
US 2023/0155897 A1  May 18, 2023

Related U.S. Application Data

(63) Continuation of application No. 16/824,556, filed on Mar. 19, 2020, now Pat. No. 11,588,699.

(51) Int. Cl.
| | |
|---|---|
| *H04L 41/12* | (2022.01) |
| *H04B 17/27* | (2015.01) |
| *H04L 41/0816* | (2022.01) |
| *H04L 41/0853* | (2022.01) |
| *H04L 41/22* | (2022.01) |
| *H04L 41/28* | (2022.01) |

(Continued)

(52) U.S. Cl.
CPC ............. *H04L 41/12* (2013.01); *H04B 17/27* (2015.01); *H04L 41/22* (2013.01); *H04W 4/80* (2018.02); *H04W 84/12* (2013.01)

(58) Field of Classification Search
CPC ..... H04L 41/12; H04L 41/22; H04L 41/0816; H04L 41/28; H04B 17/27; H04W 4/80; H04W 84/12; H04W 4/023
See application file for complete search history.

(56) References Cited

U.S. PATENT DOCUMENTS 10,716,075 B1 * 7/2020 Choi .................... H04B 17/318
10,797,987 B1 * 10/2020 Beacham ................ H04L 49/25
(Continued)

*Primary Examiner* — Asghar H Bilgrami
(74) *Attorney, Agent, or Firm* — Jaffery Watson Mendonsa & Hamilton LLP

(57) ABSTRACT

Systems and methods for detecting access points proximate to a mobile computing device to facilitate wireless network troubleshooting and management of the access points are provided. According to an embodiment, a mobile application, running on a mobile device that is operating within a physical environment, discovers a subset of wireless access points (APs) of various managed APs of a private network that are proximate to the mobile device by receiving short-range beacons originated by the subset of APs. The mobile application presents a list of the subset of APs within a user interface of the mobile application and bridges the physical environment and a network environment containing information regarding the private network. The mobile application facilitates management of a particular AP of the subset of APs by presenting configuration information or operating information for the particular AP within the user interface.

23 Claims, 8 Drawing Sheets

(51) Int. Cl.
*H04W 4/02*   (2018.01)
*H04W 4/80*   (2018.01)
*H04W 24/04*  (2009.01)
*H04W 84/12*  (2009.01)

(56) References Cited

U.S. PATENT DOCUMENTS

| | | | | |
|---|---|---|---|---|
| 10,798,631 | B2* | 10/2020 | Agarwal | H04W 36/22 |
| 2009/0082020 | A1* | 3/2009 | Ch'ng | H04W 48/20 |
| | | | | 455/435.3 |
| 2009/0286509 | A1* | 11/2009 | Huber | H04W 4/027 |
| | | | | 455/410 |
| 2010/0157941 | A1* | 6/2010 | Raghothaman | |
| | | | | H04W 36/00837 |
| | | | | 370/331 |
| 2011/0075589 | A1* | 3/2011 | Bradley | H04W 48/16 |
| | | | | 370/254 |
| 2014/0105195 | A1* | 4/2014 | Balasubarmaniyan | |
| | | | | H04W 48/20 |
| | | | | 370/338 |
| 2016/0316503 | A1* | 10/2016 | Raphael | H04W 76/11 |
| 2018/0160334 | A1* | 6/2018 | Deshpande | H04W 36/22 |
| 2018/0176792 | A1* | 6/2018 | Egner | H04W 24/02 |
| 2020/0027265 | A1* | 1/2020 | Levy | G01S 5/0252 |
| 2020/0137563 | A1* | 4/2020 | Bhattacharyya | H04L 63/062 |
| 2020/0367056 | A1* | 11/2020 | Hodge | H04W 12/009 |

* cited by examiner

DETECTING ACCESS POINTS LOCATED WITHIN PROXIMITY OF A COMPUTING DEVICE FOR TROUBLESHOOTING OF A NETWORK

CROSS REFERENCE TO RELATED APPLICATION

The present application is a continuation of U.S. patent application Ser. No. 16/824,556 entitled "DETECTING ACCESS POINTS LOCATED WITHIN PROXIMITY OF A COMPUTING DEVICE FOR TROUBLESHOOTING OF A NETWORK", and filed Mar. 19, 2020 by Thompson et al. The entirety of the aforementioned reference is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2020, Fortinet, Inc.

BACKGROUND

Field

Embodiments of the present invention generally relate to the field of wireless communication networks. In particular, embodiments of the present invention relate to systems and methods for detecting access points proximate to a mobile computing device using signals received from Bluetooth beacons supported by the access points to facilitate wireless network troubleshooting and management of the access points.

Description of the Related Art

In network architectures, hardware devices, such as wireless access points (APs), allow other Wi-Fi devices (e.g., those devices compatible with the IEEE 802.11 standards defining communication over a wireless LAN (WLAN) to connect to a network. These access points are used in organizations, businesses, homes, public places, and the like to support a large number of users with network connectivity as they have a capability for extending the wireless coverage of an existing network. A typical deployment includes many access points mounted to ceilings throughout an office, hotel, conference center, and the like. Further, the required number of access points generally increase with factors including the number of users, the capacity/throughput requirements, and the desired coverage area.

In wireless network deployments involving a large number of access points, troubleshooting becomes challenging as multiple access points may service a particular location at which a network issue, such as a connectivity issue, is being experienced. When clients report network issues, the IT/support staff is required to run diagnostics across a variety of networking devices by correlating configuration data with physical world, which is tedious and time consuming.

In view of the foregoing, there is a need for improvement in the area of developing effective approaches for detecting access points for troubleshooting the network while reducing the overhead of correlating configuration data with the physical world.

SUMMARY

Systems and methods are described for detecting access points proximate to a mobile computing device to facilitate wireless network troubleshooting and management of the access points. According to one embodiment, a mobile application, running on a mobile device that is operating within a physical environment, discovers a subset of wireless access points (APs) of various managed APs of a private network that are proximate to the mobile device by receiving short-range beacons (e.g., Bluetooth Low Energy (BLE) beacons) originated by the subset of APs. Each of the short-range beacons can contain information (e.g. unique identifier representing serial number), which identifies a respective AP of the subset of APs. The mobile application presents a list of the subset of APs within a user interface of the mobile application. Those skilled in the art would appreciate that the mobile application bridges the physical environment and a network environment containing information regarding the private network by using the identifying information for the AP to request configuration information or operating information for each AP of the subset of APs from a wireless local area network (WLAN) controller that manages various APs. The mobile application also manages a particular AP of the subset of APs by presenting the configuration information or the operating information for the particular AP within the user interface and in response to an input via the user interface, the mobile application can cause a configuration parameter associated with the particular AP to be changed.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
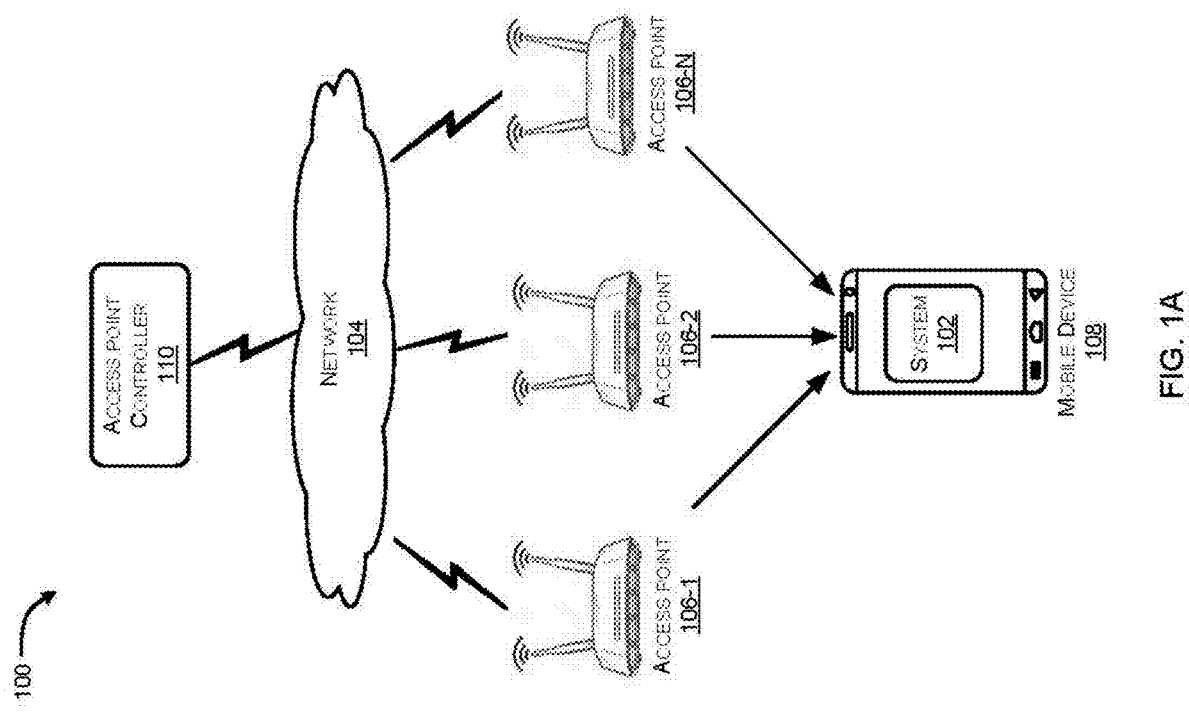
FIGS. 1A-B illustrate network architectures in which aspects of the present invention can be implemented in accordance with an embodiment of the present invention.

Systems and methods are described for detecting and managing access points proximate to a mobile computing device to facilitate wireless network troubleshooting and management of the access points. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "short-range beacon" generally refers to a package of information that is broadcast via a wireless communication protocol and has a range of between 20 meters and 200 meters. A non-limiting example of a short-range beacon is a Bluetooth Low Energy (BLE) beacon that is part of the Bluetooth V4 protocol.

The phrase "configuration information" generally refers to configuration data for an AP. In various embodiments of the present invention, configuration data is maintained by the WLAN controller of a private network and is accessible based on identifying information (e.g., a serial number) associated with the AP. Non-limiting examples of configuration data include the name(s) of the wireless network(s) broadcast by the AP, also known as service set identifier(s) (SSID(s)), the wireless frequencies and channels on which the AP operates, and its transmitting power. If any of the networks broadcast by the AP is protected by an authentication protocol (e.g., Wi-Fi Protected Access (WPA)), the settings for the authentication protocol to operate (e.g., encryption key(s)), may also be included as part of the configuration data.

The phrase "operating information" generally refers to the current operating statistics associated with an AP. In one embodiment, the operating statistics may be real-time operating statistics indicative of, but not limited to, the AP's CPU and memory utilization, the status of its radios, the number of clients connected and the throughput of the established wireless link for each of the clients. Additionally, the statistics may also include details regarding the status and throughput of the wired connections between the AP and the network 104 it is connected to.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Figure 1B:
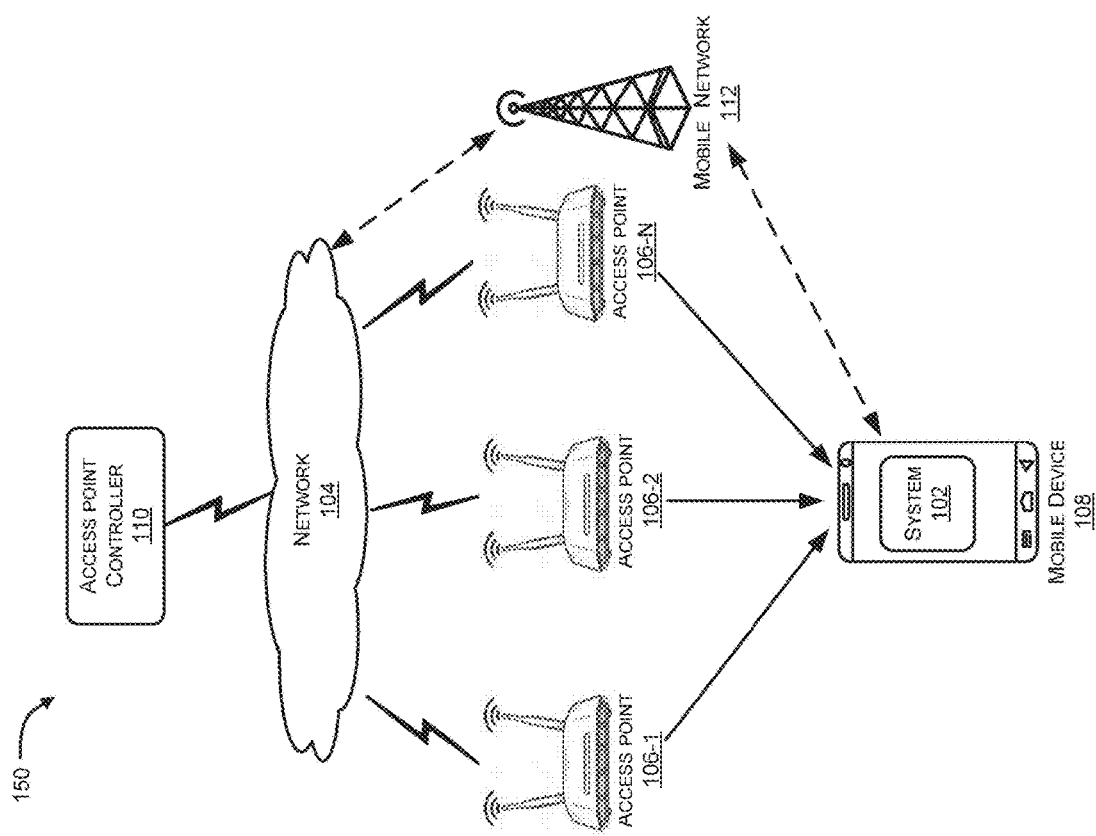

FIGS. 1A-B illustrate network architectures 100 and 150 in which aspects of the present invention can be implemented in accordance with an embodiment of the present invention. In the context of architecture 100 and 150, an access point (AP) controller 110 (which may also be referred to as Wireless Local Area Network (WLAN) controller, hereinafter) is responsible for managing various APs 106-1, 106-2, . . . 106-N (which may individually be referred to as AP 106 and may collectively be referred to as APs 106, hereinafter) of a private network 104 including any or a combination of a wireless or a wired network. Depending upon the particular implementation, the AP controller 110 may be a standalone device or may be integrated within a network security device.

A mobile device 108 associated with network 104 can implement a system 102 that facilitates configuration, management and/or monitoring of APs 106 via a mobile application running on mobile device 108. As an example, mobile device 108 can include, but is not limited to, a smart device (e.g., a smartphone), a tablet computer, or a laptop computer. In one embodiment, use of the system allows a user, an administrator, or a technician to interact with various devices associated with network 104.

Those skilled in the art will appreciate that, network 104 in architecture 100 can be a wireless network, a wired network or a combination thereof that can be implemented as one of the different types of networks, such as an Intranet, a Local Area Network (LAN), a Wide Area Network (WAN), Internet, and the like. Further, network 104 can either be dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

According to an embodiment, system 102 operates within a physical environment (e.g., a campus, a building, or the like) to discover a subset of wireless APs 106 in proximity to mobile device 108. APs proximate to mobile device 108 can be discovered by receiving short-range beacons (e.g., Bluetooth Low Energy (BLE) beacons) originated by APs 106, where each of the short-range beacons contain information identifying a respective AP 106. For example, the beacons may contain a unique identifier representing the serial number of the associated AP, which can be received by mobile device 108 to confirm discovery of AP 106. System 102 may also determine distance of each discovered AP 106 from mobile device 108 based on strength of signals associated with the received short-range beacons.

In one embodiment, system 102 may then present a list of discovered APs 106 within a user interface of the mobile application, which bridges the physical environment and a network environment containing information regarding network 104. For each AP 106 of the discovered APs 106, system 102 can use the identifying information for AP 106 to request configuration information or operating information from AP controller 110.

Referring to architecture 150, in one implementation, system 102 may send the identifying information for AP 106, through a network (e.g., mobile network 112), which is different from network 104, to receive configuration information or operating information from AP controller 110.

Further, system 102 can facilitate management of a particular AP 106 of the discovered APs 106 by presenting the configuration information or the operating information for the particular AP 106 within the user interface. In one implementation, system 102 can perform real-time diagnostics on the particular AP 106 based on the configuration information and can cause a configuration parameter associated with the particular AP 106 to be changed in response to input received via the user interface by transmitting the configuration parameter and the identifying information to AP controller 110.

Those skilled in the art will appreciate that system 102 bridges the physical environment with the network environment by allowing the administrator to detect which APs 106 are close by so that when a wireless issue comes up, the administrator can go to the physical location and run the diagnostics for nearby APs 106, for example, by obtaining configuration information (e.g., a serial number) of an AP 106 and then requesting operating information (e.g., the AP's CPU and memory utilization, the status of its radios, the number of clients connected, and/or the throughput of the established wireless link for each of the clients) from the AP controller 110 based on the obtained configuration information using mobile device 108. Therefore, system 102 reduces the overhead of correlating configuration data with the physical world.

To provide clarity, functionality of system 102 is explained with reference to the following non-limiting usage scenario. According to an example, when an administrator receives a call stating that a WiFi client is having issues in one area of a building/premises, a technician can be dispatched to the area for troubleshooting connectivity issues. The technician can use mobile device 110 to receive BLE beacons from various APs 106 located in the area to discover nearby APs 106. To the extent the APs have been mounted on the ceiling of the building, for example, without clear labels to identify them, it may be difficult to identify a particular AP associated with a particular serial number. The technician may trigger a blink on nearby APs 106 to see flashing LEDs configured on panel of APs 106, which confirms the AP(s) 106 to which the WiFi client should be connected. In one embodiment, the administrator may system 102 to plot APs 106 on a floor map to document AP locations for other administrators. In any event, continuing with the present example, the administrator may observe other APs are on the same channel as the one the WiFi client should be connecting to, which could be causing interference. Using system 102, the administrator may change the channel of one or more of the conflicting APs to see if this resolves the client connectivity issues.

Figure 2:
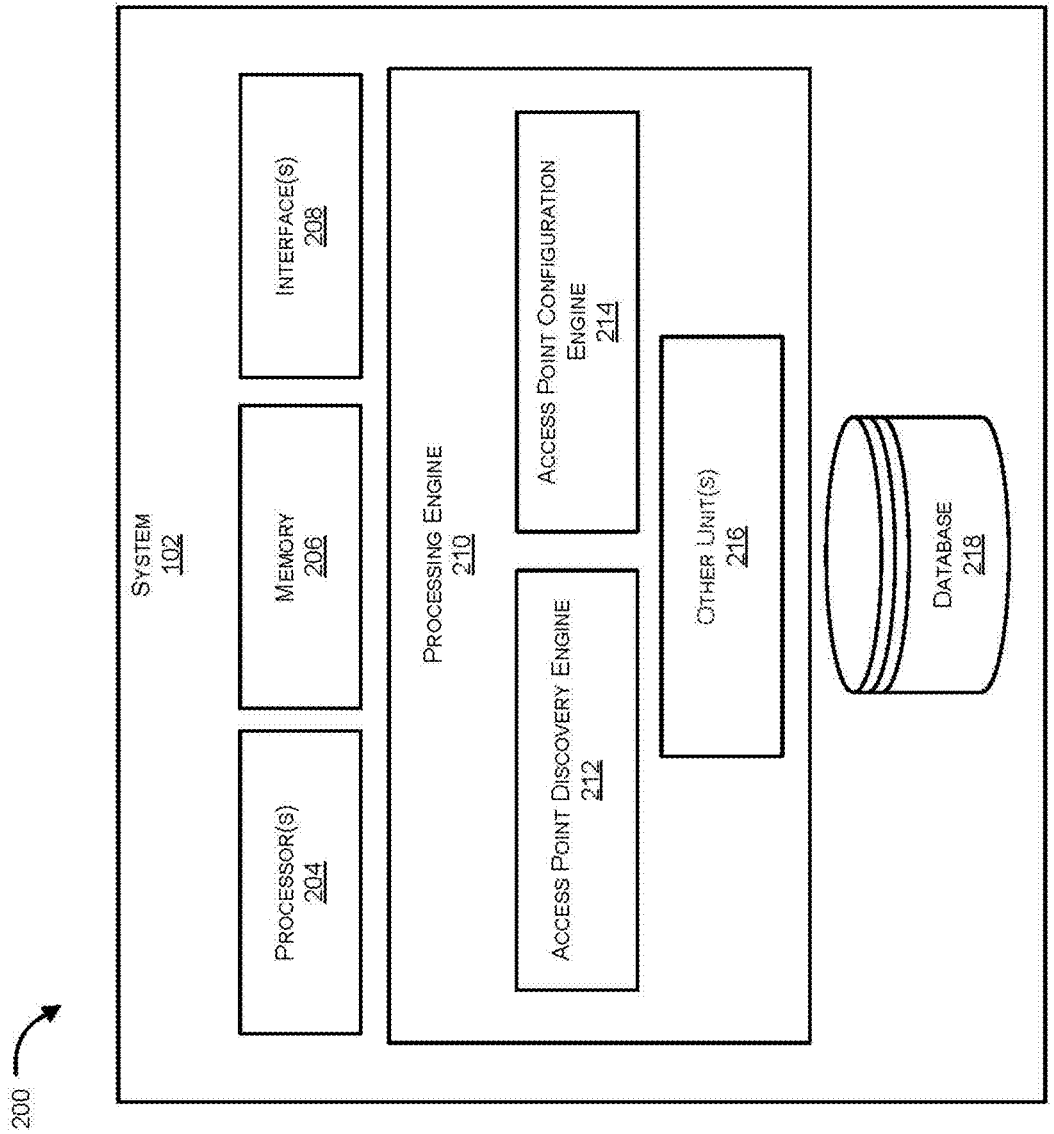
FIG. 2 is a block diagram illustrating functional components of system in accordance with an embodiment of the present invention.

FIG. 2 is a block diagram 200 illustrating functional components of system 102 in accordance with an embodiment of the present invention. In the context of the present example, system 102 include one or more processing resources (e.g., processor(s) 204). Processor(s) 204 can be implemented as one or more microprocessors, microcomputers, microcontrollers, digital signal processors, central processing units, logic circuitries, and/or any devices that manipulate data based on operational instructions. Among other capabilities, processor(s) 204 are configured to fetch and execute computer-readable instructions stored in a memory 206 of system 102. Memory 206 can store one or more computer-readable instructions or routines, which may be fetched and executed to create or share the data units over a network service. Memory 206 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

System 102 can also include one or more Interface(s) 208. Interface(s) 208 may include a variety of interfaces, for example, interfaces for data input and output devices, referred to as I/O devices, storage devices, and the like. Interface(s) 208 may facilitate communication of system 102 with various devices coupled to system 102. Interface(s) 208 may also provide a communication pathway for one or more components of system 102. Examples of such components include, but are not limited to, processing engine(s) 210 and database 218.

Processing engine(s) 210 can be implemented as a combination of hardware and software or firmware programming (for example, programmable instructions) to implement one or more functionalities of engine(s) 210. In the examples described herein, such combinations of hardware and software or firmware programming may be implemented in several different ways. For example, the programming for the engine(s) 210 may be processor executable instructions stored on a non-transitory machine-readable storage medium and the hardware for engine(s) 210 may include a processing resource (for example, one or more processors), to execute such instructions. In the examples, the machine-readable storage medium may store instructions that, when executed by the processing resource, implement engine(s) 210. In such examples, system 102 can include the machine-readable storage medium storing the instructions and the processing resource to execute the instructions, or the machine-readable storage medium may be separate but accessible to system 102 and the processing resource. In other examples, processing engine(s) 210 may be implemented by electronic circuitry. Database 218 can include data that is either stored or generated as a result of functionalities implemented by any of the components of processing engine(s) 210.

In an example, processing engine(s) 210 can include an access point discovery engine 212, an access point configuration engine 214 and other engine(s) 216. Other engine(s) 216 can implement functionalities that supplement applications or functions performed by system 102 or processing engine(s) 210.

According to an embodiment, access point discovery engine 212 is responsible for discovering wireless APs of a private network that are proximate to a mobile device. In an implementation, various APs can originate short-range beacons (e.g., BLE beacons) containing information identifying a respective AP (e.g., by a unique identifier representing a serial number) so that the beacons can be received by access point discovery engine 212. As an example, the unique identifier can be a cryptographic hash of the serial number and can optionally encode additional information (e.g., major and minor numbers to encode and broadcast the current Virtual Domain Identifier (VDOM ID) of an AP controller).

Those skilled in the art will appreciate that access point discovery engine 212 can discover the proximate APs based on received short range beacons. According to an implementation, access point discovery engine 212 can also determine a distance of each AP of the discovered APs from the mobile device based on the strength of the respective signals associated with the received short-range beacons.

According to an embodiment, access point configuration engine 214 presents a list of the discovered APs within a user interface of system 102 to facilitate bridging the physical environment and a network environment containing information regarding the private network. For example, for each discovered AP, access point configuration engine 214 can use the identifying information for the AP to request configuration information and/or operating information for the AP from a WLAN controller that manages the APs.

Access point configuration engine 214 also facilitates management of a particular AP of the discovered APs by presenting the configuration information and/or the operating information for the particular AP within the user interface. For example, access point configuration engine 214 can perform real-time diagnostics on the particular AP based on the configuration information so that if required, a configuration parameter associated with the particular AP can be changed in response to input received via the user interface by transmitting the configuration parameter and the identifying information to the WLAN controller.

Figure 3:
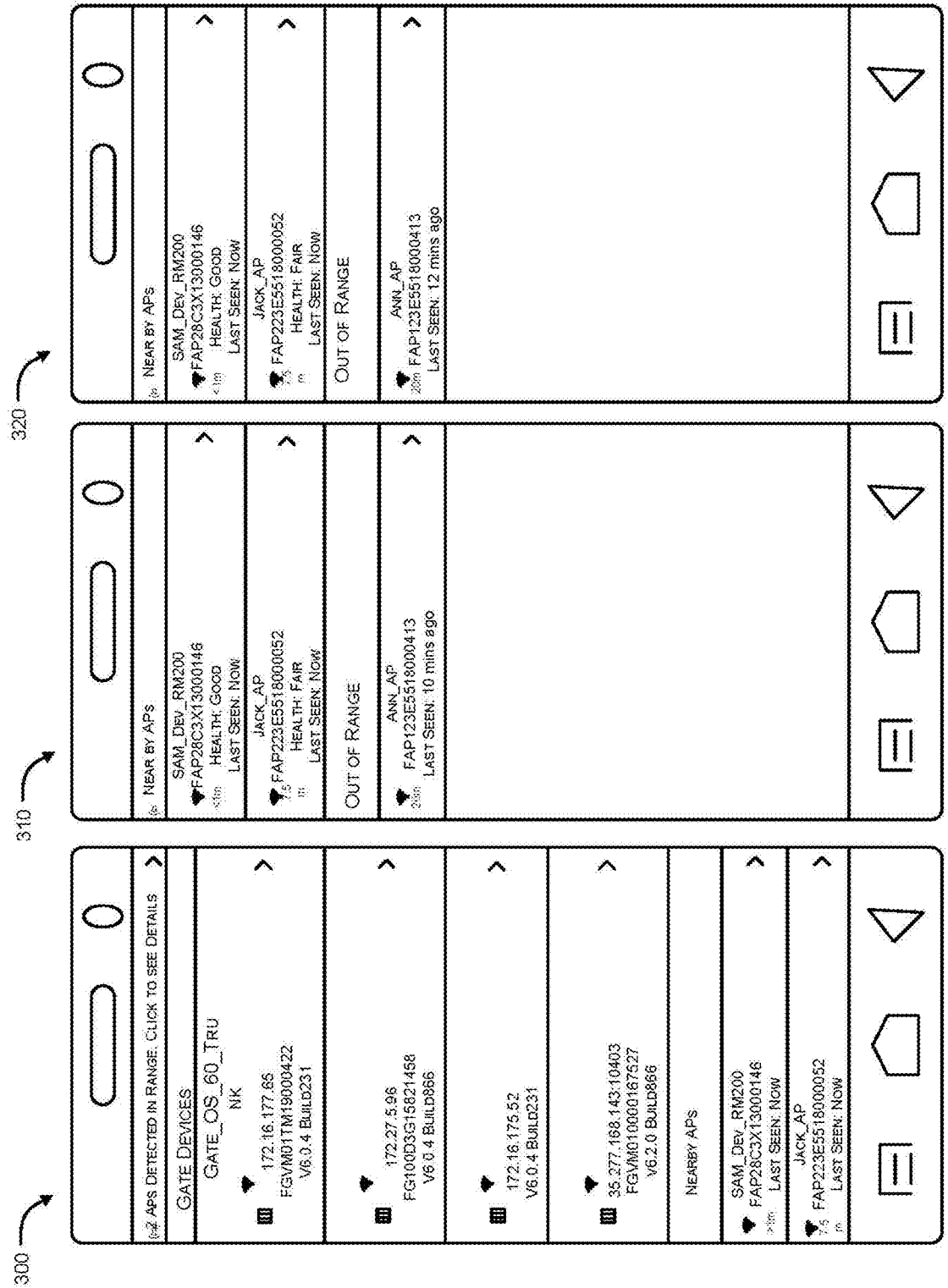
FIG. 3 illustrates screen shots of a user interface of a mobile application that may be used for detection of access points in accordance with an embodiment of the present invention.

FIG. 3 illustrates screen shots 300, 310, and 320 of a user interface of a mobile application that may be used for detection of access points in accordance with an embodiment of the present invention. Screen shots 300, 320 and 310 represent a user interface of a mobile device at different times based on a location of a user (e.g., an administrator or technician) or based on interactions with the user interface.

In the context of the present example, screen shot 300 shows a list of all gateway devices associated with a network and a separate list of nearby APs along with last seen status. Screen shots 310 and 320 show a real time determination of distance of the APs from the mobile device based on signal strength of received beacons along with the health of the discovered APs. While only three static images are provided in FIG. 3, those skilled in the art will appreciate that information displayed by screen shots 300, 310, and/or 320 may continuously be updated responsive to movement of the mobile device in the physical environment.

Figure 4:
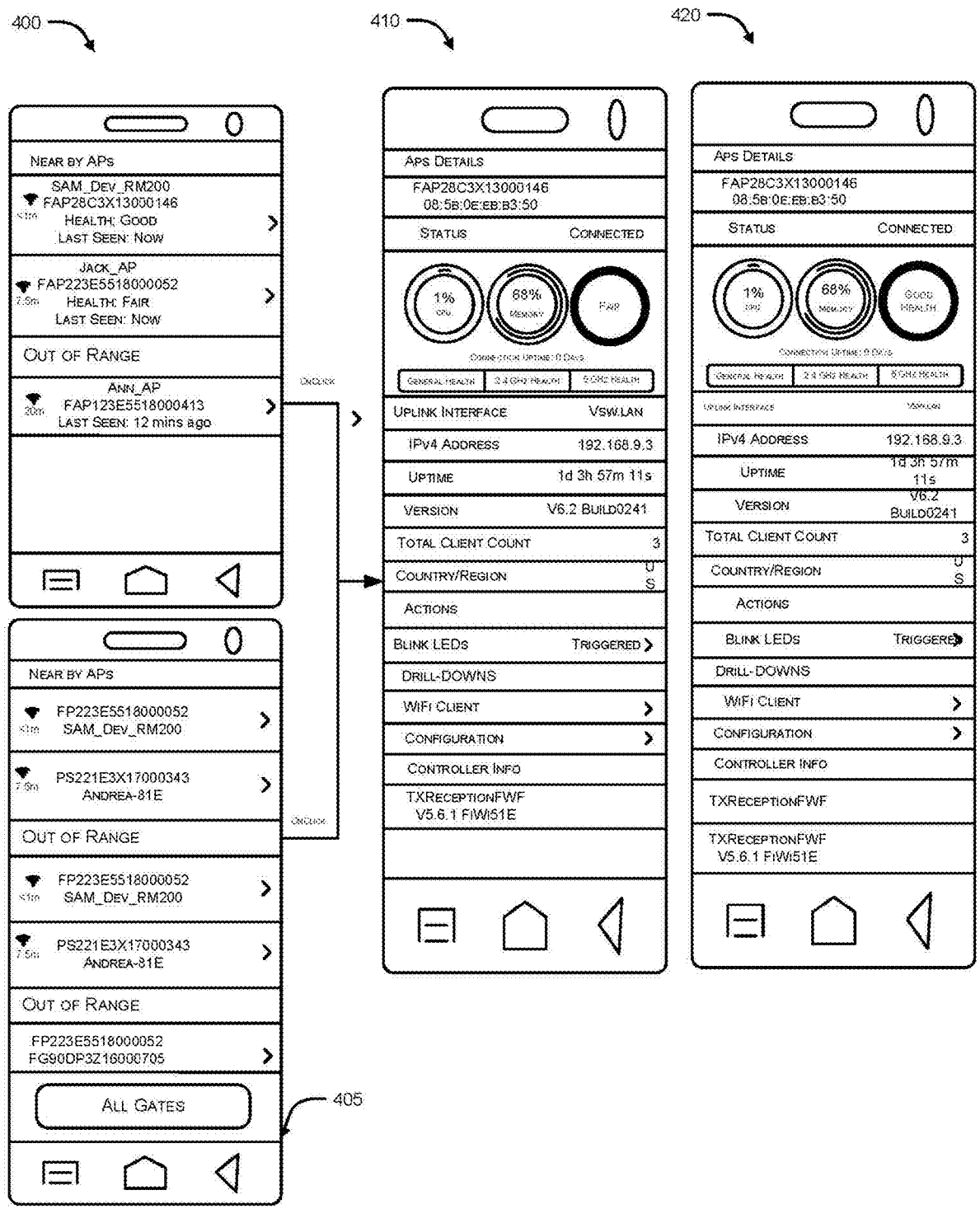
FIG. 4 illustrates screen shots of a user interface of a mobile application that may be used for analyses of configuration information of APs in accordance with an embodiment of the present invention.

FIG. 4 illustrates screen shots 400, 405, 410 and 420 of a user interface of a mobile application that may be used for analyses of configuration information of APs in accordance with an embodiment of the present invention. In the context of the present example, screen shots 400 and 405 show lists of nearby gateway devices and/or APs associated with a network as well as gateway devices and/or APs that are out of range.

In the context of the present example, screen shots 410 and 420 show real-time operating statistics at different instances and which can be accessed by selecting different interface elements of screen shots 400 and 405. For example, to access screen shot 420, the user may select the desired AP from screen shot 400 by or select the out of range header from screen shot 405. The operating statistics presented for an AP on screen shots 410 and 420 may be indicative of CPU utilization, memory utilization, health of radios, number of clients connected to the AP, etc.

Figure 5:
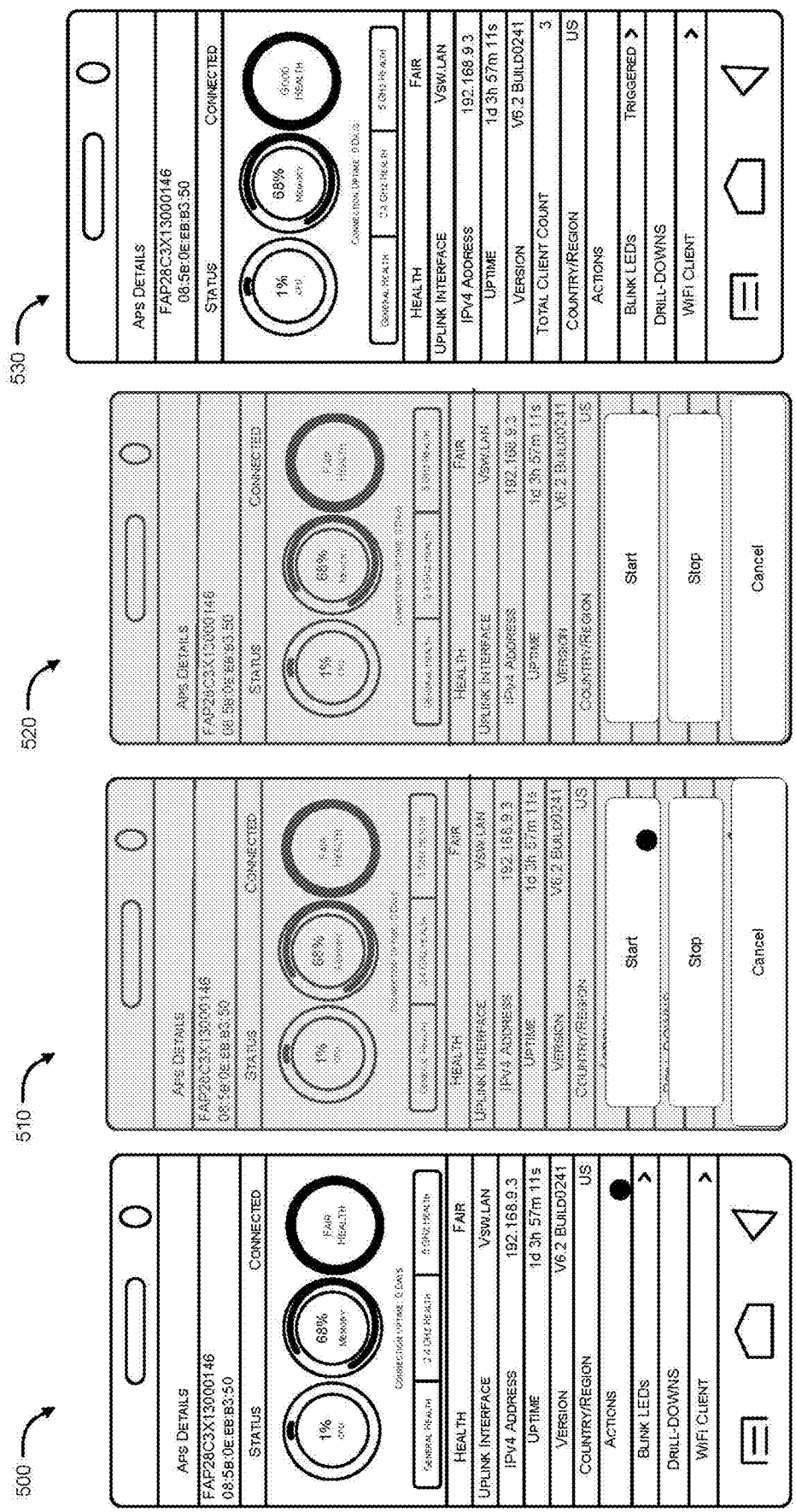
FIG. 5 illustrate exemplary screen shots of a user interface of a mobile application that may be used to blink a light emitting diode (LED) of an access point in accordance with an embodiment of the present invention.

FIG. 5 illustrate exemplary screen shots 500, 510, 520, and 530 of a user interface of a mobile application that may be used to blink a light emitting diode (LED) of an access point in accordance with an embodiment of the present invention. In the context of the present example, responsive to the user selecting "actions" on screen shot 500, the blink LEDs, Drill-downs and WiFi client options are presented. Further, responsive to the user selecting the "blink LEDs" option, screen shot 500 may transition to screen shot 510 to allow the user to start, stop and cancel the blinking of the LEDs for the AP at issue. Triggering of an LED associated with an AP aids visual identification of the AP at issue as the administrator/technician can see LED blink on the panel of the AP to confirm that he/she is looking at the correct AP. Alternately or additionally, the APs can be operable to emit a sound to facilitate location of the AP at issue. In one embodiment, the AP is caused to blink its LED as a result of the mobile application issuing a request to the AP controller and providing the serial number of the AP to which the request corresponds.

The processing described with reference to FIG. 6 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms (e.g., virtual and/or physical), such as a mobile device or the computer system 700 described with reference to FIG. 7 below.

Figure 6:
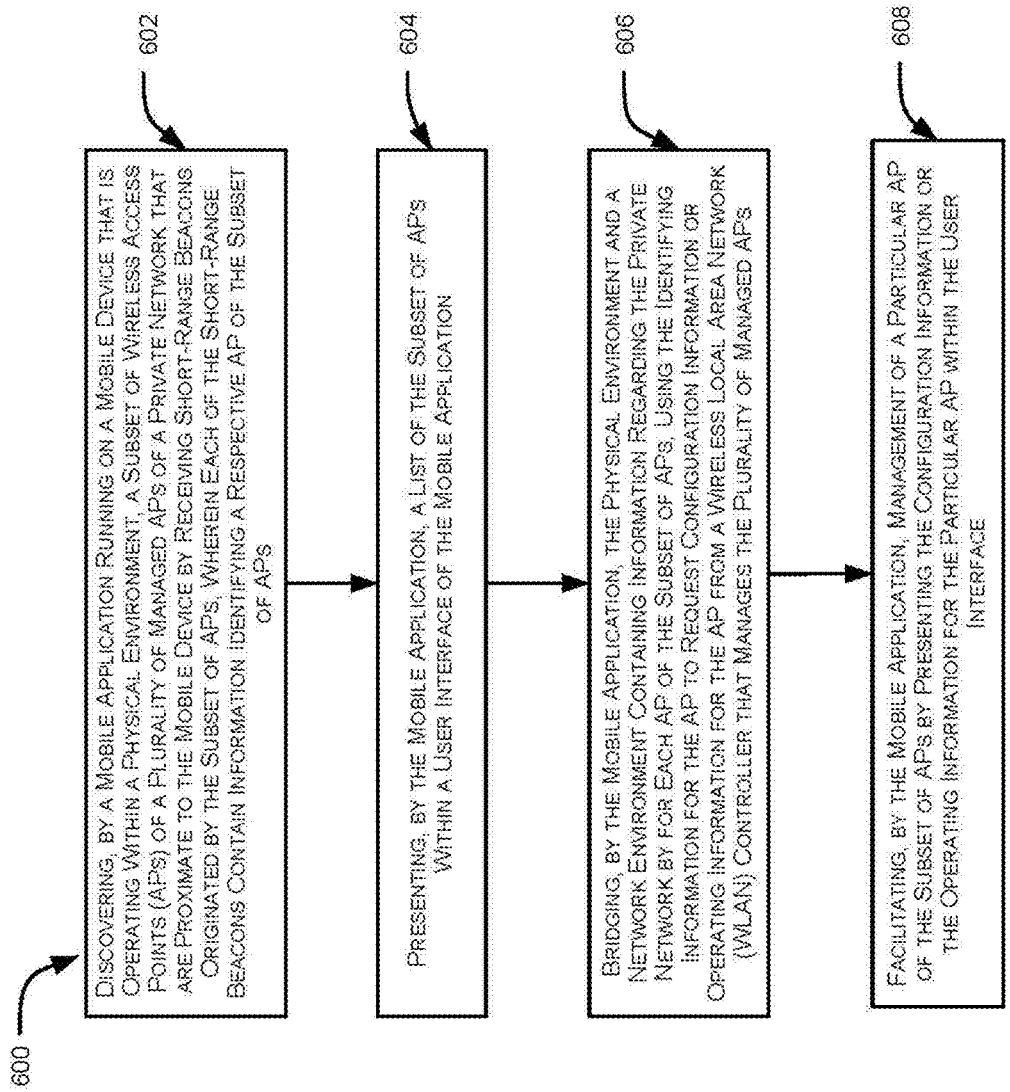
FIG. 6 is a flow diagram illustrating a process performed a mobile application that facilitates configuration, management and monitoring of network security appliance and access points in accordance with an embodiment of the present invention.

FIG. 6 is a flow diagram 600 illustrating a process performed by a mobile application that facilitates configuration, management and monitoring of access points in accordance with an embodiment of the present invention.

At block 602, a subset of wireless APs of various managed APs of a private network that are proximate to a mobile device are discovered by a mobile application running on the mobile device by receiving short-range beacons originated by the subset of APs. In one embodiment, each of the short-range beacons contain information identifying a respective AP of the subset of APs. For example, BLE beacons transmitted by the APs may include their respective serial numbers or a cryptographic hash of their respective serial numbers.

At block 604, the mobile application presents a list of the subset of APs within a user interface of the mobile application. In one embodiment, the position of an AP within the list may be based on the distance from the mobile device relative to the distance of the other APs, with closer APs being presented first. According to one embodiment, the distance between an AP and the mobile device may be estimated/calculated based on a signal strength associated with the received short-range beacon from the AP.

At block 606, the mobile application bridges the physical environment and a network environment containing information regarding the private network by, for each AP of the subset of APs, using the identifying information for the AP to request configuration information and/or operating information for the AP from a WLAN controller that manages the various APs. For example, the mobile application may issue a request to the controller for the desired configuration information and/or operating information and specifying the serial number of the AP at issue.

At block 608, the mobile application facilitates management of a particular AP of the subset of APs by presenting the configuration information and/or the operating information for the particular AP within the user interface.

Figure 7:
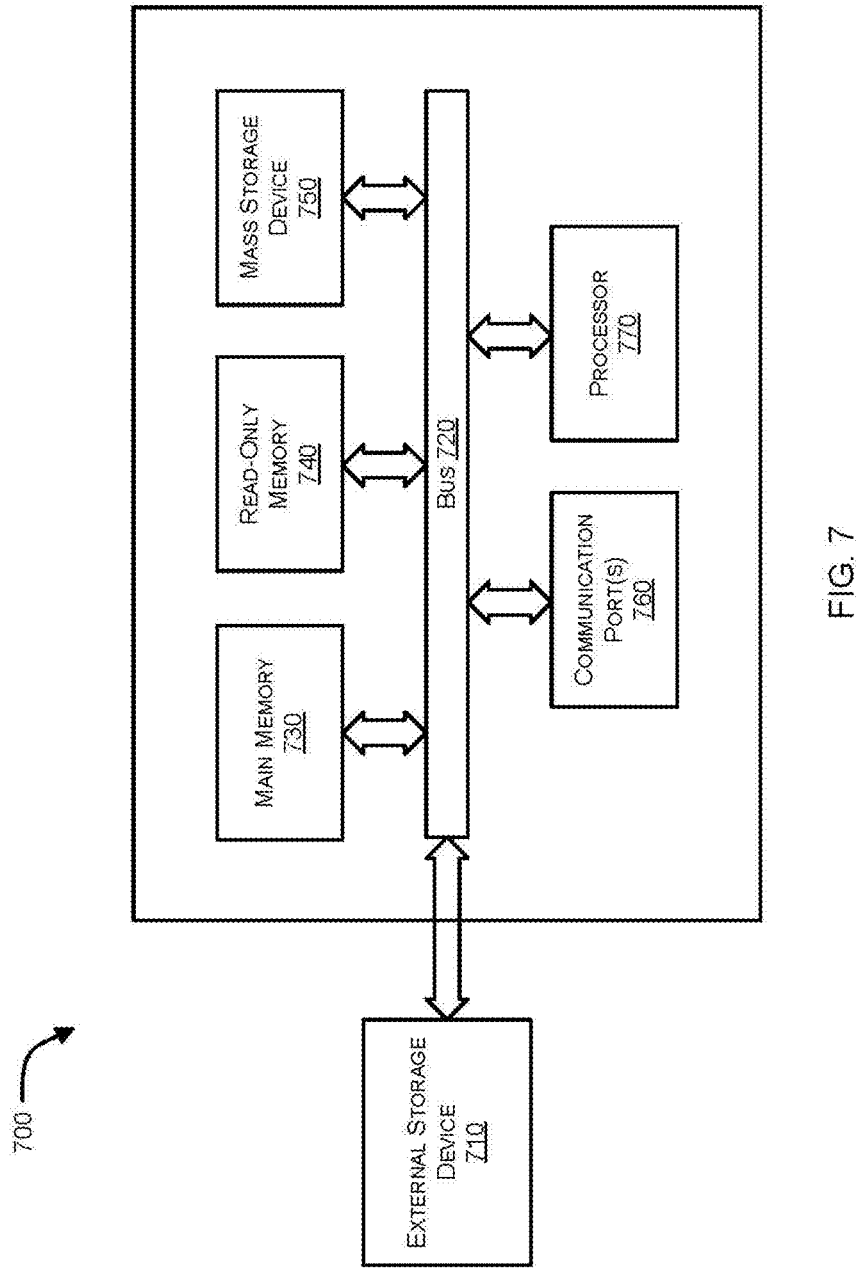
FIG. 7 illustrates an exemplary computer system in which or with which embodiments of the present invention may be utilized.

FIG. 7 illustrates an exemplary computer system 700 in which or with which embodiments of the present invention may be utilized. Computer system may represent some portion of a mobile device (e.g., mobile device 108), an AP controller (e.g., AP controller 110) or a network security appliance.

As shown in FIG. 7, computer system includes an external storage device 710, a bus 720, a main memory 730, a read only memory 740, a mass storage device 750, a communication port 760, and a processor 770. Those skilled in the art will appreciate that computer system 700 may include more than one processor 770 and communication ports 760. Examples of processor 770 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 770 may include various modules associated with embodiments of the present invention.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g. start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with computer system. Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A mobile device comprising:
   a processing resource; and
   a non-transitory computer-readable medium, coupled to the processing resource, having stored therein instructions that when executed by the processing resource cause the processing resource to:
   discover a subset of wireless access points (APs) of a plurality of managed APs of a private network that are proximate to the mobile device by receiving short-range beacons originated by the subset of APs, wherein each of the short-range beacons contain information identifying a respective AP of the subset of APs; and
   bridge the physical environment and a network environment containing information regarding the private network by for each AP of the subset of APs, using the identifying information for the AP to request configuration information or operating information for the AP from a wireless local area network (WLAN) controller that manages the plurality of managed APs.

2. The mobile device of claim 1, wherein the mobile device includes a user display, and wherein the non-transitory computer-readable medium further has stored therein instructions that when executed by the processing resource cause the processing resource to:
present a list of the subset of APs within a user interface of the mobile application.

3. The mobile device of claim 2, wherein the non-transitory computer-readable medium further has stored therein instructions that when executed by the processing resource cause the processing resource to:
present a list of the subset of APs within a user interface of the mobile application.

4. The mobile device of claim 1, wherein the non-transitory computer-readable medium further has stored therein instructions that when executed by the processing resource cause the processing resource to:
determine respective distances of the subset of APs from the mobile device based on a strength of signals associated with the received short-range beacons; and
wherein said presenting a list of the subset of APs within a user interface of the mobile application includes ordering the list in accordance with said distances.

5. The mobile device of claim 1, wherein the identifying information comprises a unique identifier.

6. The mobile device of claim 1, wherein the non-transitory computer-readable medium further has stored therein instructions that when executed by the processing resource cause the processing resource to:
determine a distance of each AP of the subset of APs from the mobile device based on a strength of signals associated with the received short-range beacons.

7. The mobile device of claim 1, wherein the short-range beacons comprise Bluetooth Low Energy (BLE) beacons.

8. The mobile device of claim 1, wherein the non-transitory computer-readable medium further has stored therein instructions that when executed by the processing resource cause the processing resource to:
perform real-time diagnostics on the particular AP based on the configuration information.

9. The mobile device of claim 1, wherein the WLAN controller is implemented within a network security device.

10. The mobile device of claim 1, wherein the non-transitory computer-readable medium further has stored therein instructions that when executed by the processing resource cause the processing resource to:
cause a configuration parameter associated with the particular AP to be changed responsive to input via the user interface by transmitting the configuration parameter and the identifying information to the WLAN controller.

11. A method comprising:
discovering, by a mobile application running on a mobile device that is operating within a physical environment, a subset of wireless access points (APs) of a plurality of managed APs of a private network that are proximate to the mobile device by receiving short-range beacons originated by the subset of APs, wherein each of the short-range beacons contain information identifying a respective AP of the subset of APs; and
bridging, by the mobile application, the physical environment and a network environment containing information regarding the private network by for each AP of the subset of APs, using the identifying information for the AP to request configuration information or operating information for the AP from a wireless local area network (WLAN) controller that manages the plurality of managed APs.

12. The method of claim 11, the method further comprising:
presenting, by the mobile application, a list of the subset of APs within a user interface of the mobile application.

13. The method of claim 12, the method further comprising:
facilitating, by the mobile application, management of a particular AP of the subset of APs by presenting the configuration information or the operating information for the particular AP within the user interface.

14. The method of claim 11, wherein the private network comprises any or a combination of a wireless or a wired network.

15. The method of claim 11, wherein the short-range beacons comprise Bluetooth Low Energy (BLE) beacons.

16. The method of claim 11, wherein the identifying information comprises a unique identifier.

17. The method of claim 11, the method further comprising:
determining, by the mobile application, a distance of each AP of the subset of APs from the mobile device based on a strength of signals associated with the received short-range beacons.

18. The method of claim 11, the method further comprising:
performing, by the mobile application, real-time diagnostics on the particular AP based on the configuration information.

19. The method of claim 11, wherein the WLAN controller is implemented within a network security device.

20. The method of claim 11, the method further comprising:
causing, by the mobile application, a configuration parameter associated with the particular AP to be changed responsive to input via the user interface by transmitting the configuration parameter and the identifying information to the WLAN controller.

21. A non-transitory computer-readable storage medium embodying a set of instructions, which when executed by a processing resource of a mobile device operating within a physical environment, causes the processing resource to:
discover a subset of wireless access points (APs) of a plurality of managed APs of a private network that are proximate to the mobile device by receiving short-range beacons originated by the subset of APs, wherein each of the short-range beacons contain information identifying a respective AP of the subset of APs; and
bridge the physical environment and a network environment containing information regarding the private network by for each AP of the subset of APs, using the identifying information for the AP to request configuration information or operating information for the AP from a wireless local area network (WLAN) controller that manages the plurality of managed APs.

22. The non-transitory computer-readable storage medium of claim 21, wherein the mobile device includes a user display, and wherein the non-transitory computer-readable medium further has stored therein instructions that when executed by the processing resource cause the processing resource to:

present a list of the subset of APs within a user interface of the mobile application.

23. The non-transitory computer-readable storage medium of claim 22, wherein the non-transitory computer-readable medium further has stored therein instructions that when executed by the processing resource cause the processing resource to:
present a list of the subset of APs within a user interface of the mobile application.

\* \* \* \* \*